United States Patent
Buitron et al.

(10) Patent No.: US 7,083,502 B2
(45) Date of Patent: Aug. 1, 2006

(54) METHOD FOR SIMULTANEOUS TWO-DISK TEXTURING

(75) Inventors: Gerardo Buitron, San Jose, CA (US); Walter Crofton, Castro Valley, CA (US); Barry Okamoto, San Ramon, CA (US); Lynnette A. Sagen, San Jose, CA (US); Nghia Ta, San Jose, CA (US)

(73) Assignee: Maxtor Corporation, Longmont, CO (US)

( * ) Notice: Subject to any disclaimer, the term of this patent is extended or adjusted under 35 U.S.C. 154(b) by 0 days.

(21) Appl. No.: 10/434,547

(22) Filed: May 9, 2003

(65) Prior Publication Data

US 2004/0070092 A1 Apr. 15, 2004

Related U.S. Application Data

(60) Provisional application No. 60/417,623, filed on Oct. 10, 2002, provisional application No. 60/417,711, filed on Oct. 10, 2002.

(51) Int. Cl.
*B24B 1/00* (2006.01)
(52) U.S. Cl. .............................. 451/41; 451/57; 451/63; 451/262; 451/333
(58) Field of Classification Search .................. 451/36, 451/37, 41, 57, 58, 63, 262, 264, 265, 267, 451/268, 269, 331, 333, 335, 337
See application file for complete search history.

(56) References Cited

U.S. PATENT DOCUMENTS

| | | | |
|---|---|---|---|
| 3,382,647 A | 5/1968 | Davey et al. | |
| 3,505,777 A | 4/1970 | Tsutsumi | |
| 4,573,851 A | 3/1986 | Butler | 414/404 |
| 4,676,008 A | 6/1987 | Armstrong | 34/237 |
| 4,694,778 A | 9/1987 | Learn et al. | 118/728 |
| 4,695,217 A | 9/1987 | Lau | 414/404 |
| 4,768,328 A | 9/1988 | Mims | |
| 4,808,456 A | 2/1989 | Yamada et al. | |
| 4,819,579 A | 4/1989 | Jenkins | 118/728 |
| 4,840,530 A | 6/1989 | Nguyen | 414/404 |
| 4,856,957 A * | 8/1989 | Lau et al. | 414/404 |
| 4,947,624 A | 8/1990 | Cones, Sr. et al. | 53/540 |
| 4,947,784 A | 8/1990 | Nishi | 414/404 |
| 4,958,982 A | 9/1990 | Champet et al. | 414/751.1 |
| 4,962,879 A | 10/1990 | Goesele et al. | |
| 4,981,222 A | 1/1991 | Lee | 211/41 |
| 4,987,407 A | 1/1991 | Lee | 340/540 |
| 5,111,936 A | 5/1992 | Kos | 206/334 |
| 5,125,784 A | 6/1992 | Asano | 414/404 |

(Continued)

FOREIGN PATENT DOCUMENTS

EP 0 177 073 8/1985

(Continued)

OTHER PUBLICATIONS

Australian Written Opinion and Search Report, Dec. 17, 2004, Singapore Application No. SG200302857-8.

(Continued)

*Primary Examiner*—Timothy V. Eley
(74) *Attorney, Agent, or Firm*—Sheridan Ross P.C.

(57) ABSTRACT

Various methods and apparatus for simultaneously texturing two single-sided hard memory disks is provided. The two disks are placed in a concentric contact merge orientation such that the outwardly facing surface of each disk may be simultaneously subjected to texturing by equipment designed to texture one double-sided disk.

49 Claims, 12 Drawing Sheets

U.S. PATENT DOCUMENTS

| | | | | |
|---|---|---|---|---|
| 5,188,499 | A | 2/1993 | Tarng et al. | 414/404 |
| 5,269,643 | A | 12/1993 | Kodama et al. | 414/416 |
| 5,314,107 | A | 5/1994 | D'Aragona et al. | 228/116 |
| 5,430,992 | A | 7/1995 | Olson | 53/399 |
| 5,478,622 | A | 12/1995 | Nakamura et al. | |
| 5,486,134 | A * | 1/1996 | Jones et al. | 451/209 |
| 5,497,085 | A | 3/1996 | Tian et al. | |
| 5,501,568 | A | 3/1996 | Ono | 414/417 |
| 5,620,295 | A | 4/1997 | Nishi | 414/416.11 |
| 5,664,407 | A | 9/1997 | Cooper, III et al. | |
| 5,820,449 | A * | 10/1998 | Clover | 451/287 |
| 5,906,469 | A | 5/1999 | Oka et al. | 414/416 |
| 5,926,352 | A | 7/1999 | Murayama et al. | |
| 5,956,317 | A | 9/1999 | Komiyama et al. | |
| 5,976,255 | A | 11/1999 | Takaki et al. | 118/500 |
| 6,007,896 | A | 12/1999 | Bhushan | |
| 6,033,522 | A * | 3/2000 | Iwata et al. | 156/345.12 |
| 6,107,599 | A * | 8/2000 | Baumgart et al. | 219/121.77 |
| 6,182,814 | B1 | 2/2001 | Koehler | |
| 6,345,947 | B1 | 2/2002 | Egashira | 414/225.01 |
| 6,354,794 | B1 | 3/2002 | Sato et al. | 414/811 |
| 6,368,040 | B1 | 4/2002 | Yamasaki et al. | 414/222 |
| 6,427,850 | B1 | 8/2002 | Mendiola | 211/41.18 |
| 6,457,929 | B1 | 10/2002 | Sato et al. | 414/404 |
| 6,582,279 | B1 * | 6/2003 | Fox et al. | 451/37 |
| 6,612,801 | B1 | 9/2003 | Koguchi | 414/416.02 |
| 6,625,835 | B1 | 9/2003 | Frost et al. | 15/77 |
| 6,626,744 | B1 * | 9/2003 | White et al. | 451/66 |
| 6,769,855 | B1 | 8/2004 | Yokomori et al. | 414/416.02 |
| 2002/0006324 | A1 | 1/2002 | Sato et al. | 414/416.12 |
| 2003/0179692 | A1 | 9/2003 | Ohotomo | |
| 2003/0208899 | A1 | 11/2003 | Grow et al. | 29/458 |
| 2003/0209389 | A1 | 11/2003 | Buitron et al. | 184/6 |
| 2003/0209421 | A1 | 11/2003 | Buitron et al. | 204/192.2 |
| 2003/0210498 | A1 | 11/2003 | Kim et al. | 360/135 |
| 2003/0211275 | A1 | 11/2003 | Buitron et al. | 428/64.1 |
| 2003/0211361 | A1 | 11/2003 | Kim et al. | 428/694 R |
| 2004/0013011 | A1 | 1/2004 | Valeri | 365/200 |
| 2004/0016214 | A1 | 1/2004 | Buitron | 53/474 |
| 2004/0035737 | A1 | 2/2004 | Buitron et al. | 206/454 |
| 2004/0068862 | A1 | 4/2004 | Buitron et al. | 29/604 |
| 2004/0069662 | A1 | 4/2004 | Buitron et al. | 206/307.1 |
| 2004/0070859 | A1 | 4/2004 | Crofton et al. | 360/1 |
| 2004/0071535 | A1 | 4/2004 | Crofton et al. | 414/416.09 |

FOREIGN PATENT DOCUMENTS

| | | | |
|---|---|---|---|
| EP | 0 192 244 | 2/1986 | |
| EP | 768704 | 4/1997 | 414/416.02 |
| JP | 63122527 A | 5/1988 | |
| JP | 04067333 A | 3/1992 | |
| JP | 05028533 A | 2/1993 | |
| JP | 06076384 A | 3/1994 | |
| JP | 7-263521 | 10/1995 | 414/416.02 |
| JP | 07296418 A | 11/1995 | |
| JP | 08249802 A | 9/1996 | |
| JP | 08273210 | 10/1996 | |
| JP | 10228674 A | 8/1998 | |
| JP | 11265506 A | 9/1999 | |
| JP | 2001232667 | 8/2001 | |
| WO | WO 9836867 A1 | 8/1998 | |

OTHER PUBLICATIONS

Mar. 12, 2005 Invitiation to Respond to Written Opinion from Intellectual Property Office of Singapore to Tan Jinhwee, Eunice & Lim Chooeng.

"Design of an active memory system for network applications"; Asthana, A.; Cravatts, M.; Krzyzanowski, P.; Memory Technology, Design and Testing, Aug. 8-9, 1994; pp. 58-63.

"DVD technology"; Tsinberg, M. Eggrs, C.; Image Processing, 1998 ICIP 98 Proceedings. 1998 Int'l Conf on vol. 1; Oct. 4-7, 1998, p. 2: 2 vol. 1.

* cited by examiner

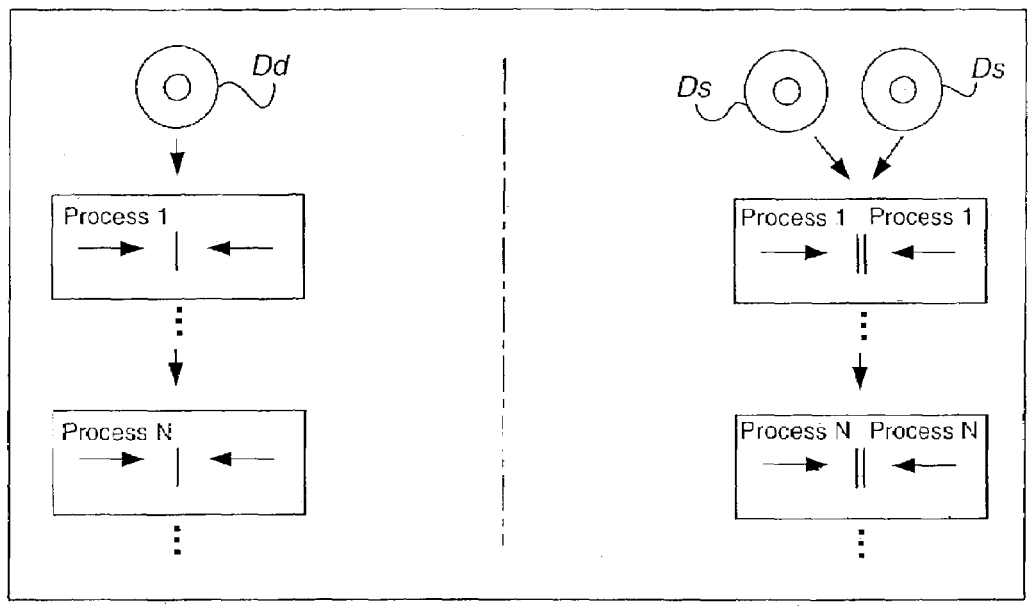
FIG. 1
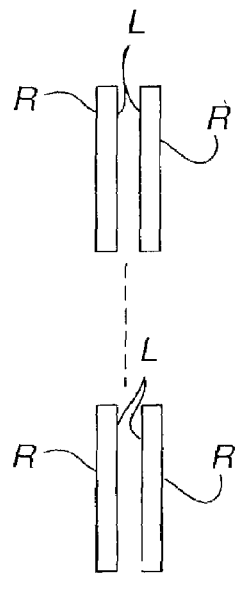   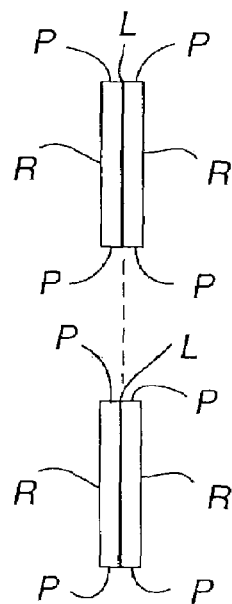   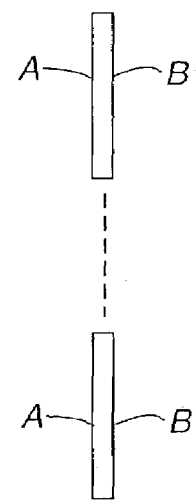
FIG. 2    FIG. 3    FIG. 4

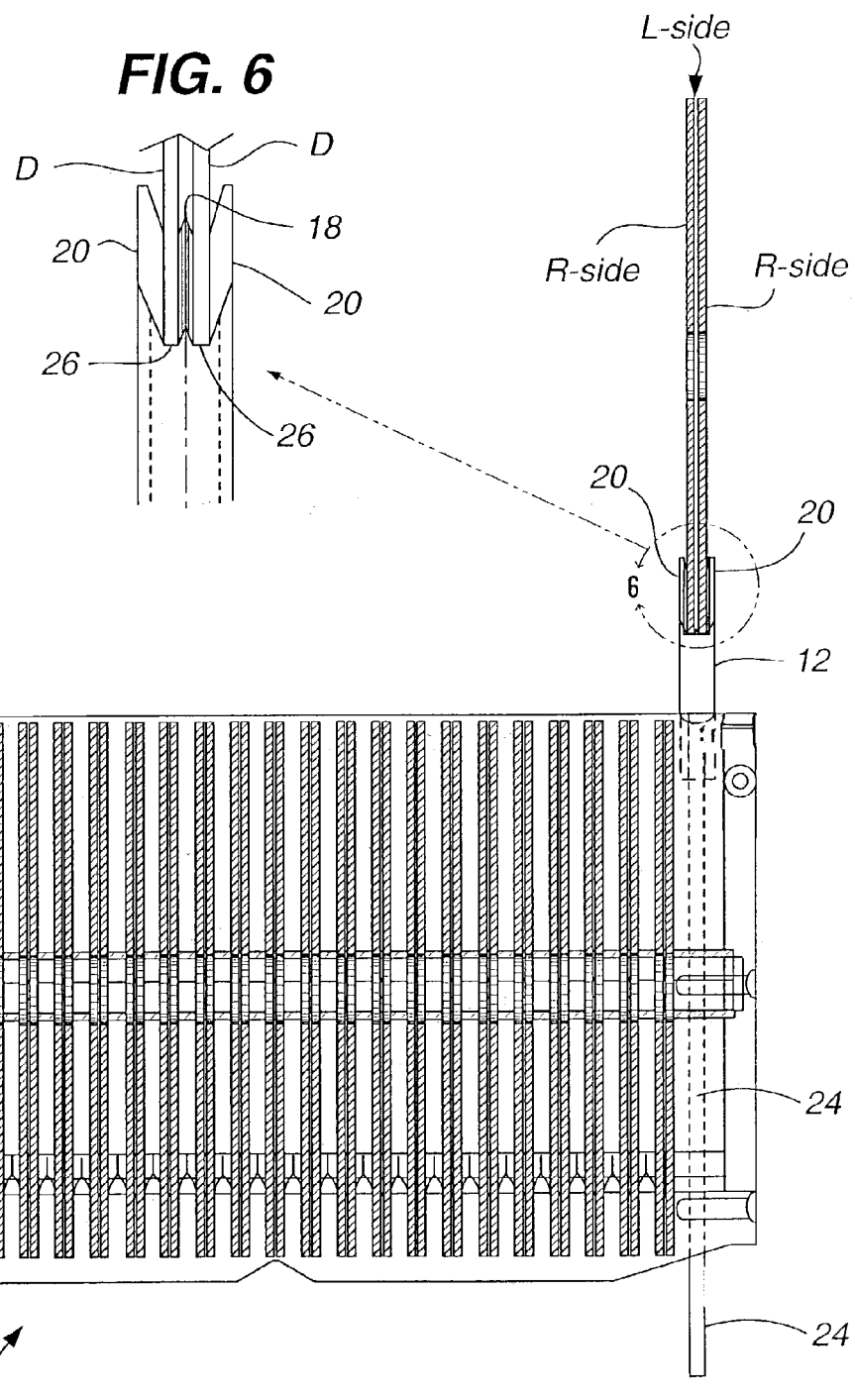

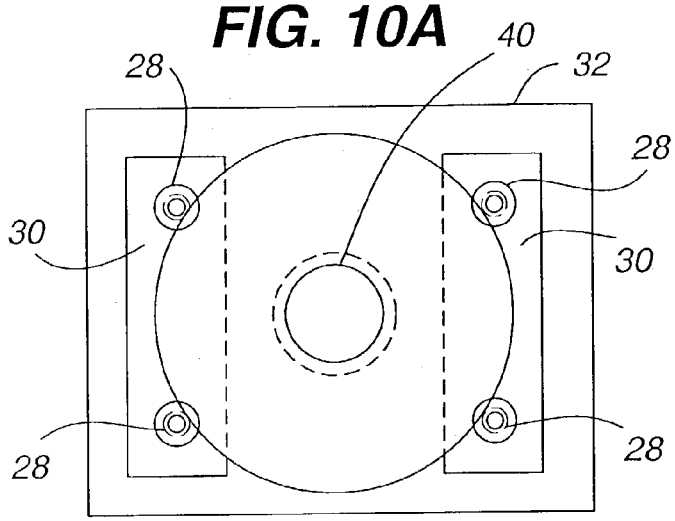
FIG. 10A
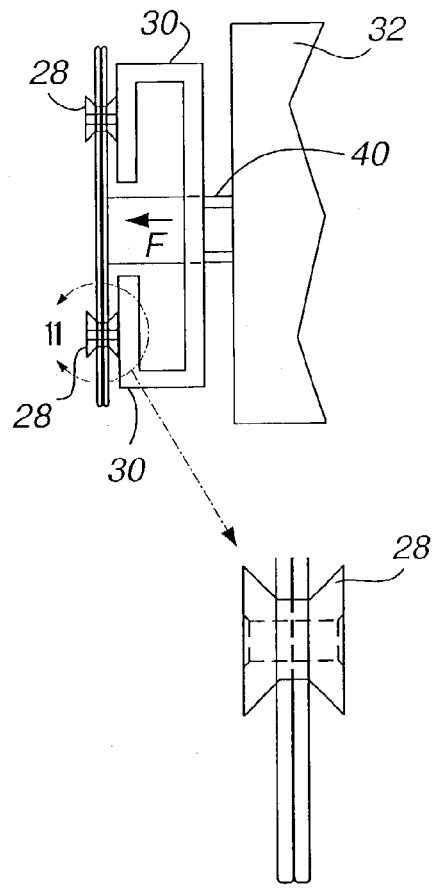
FIG. 10B
FIG. 11
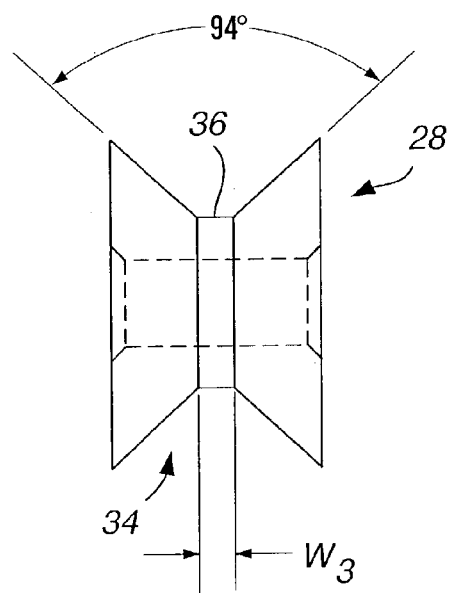
FIG. 12

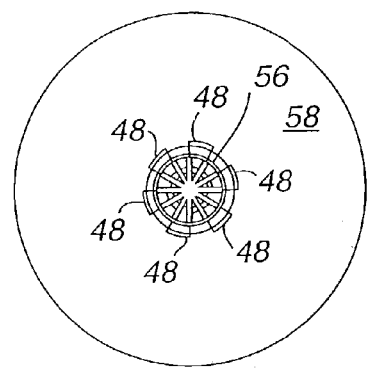
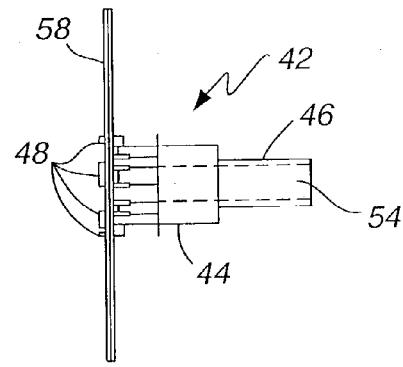
FIG.14A  FIG.14B
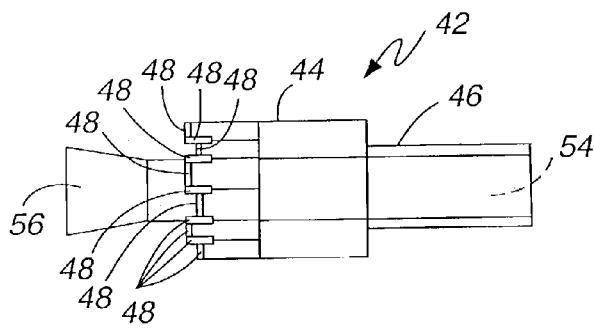
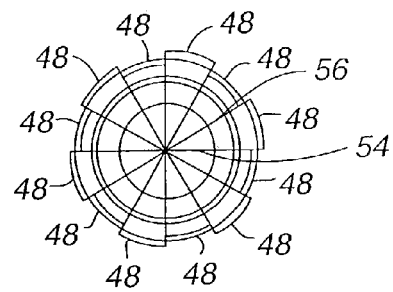
FIG.15A  FIG.15B
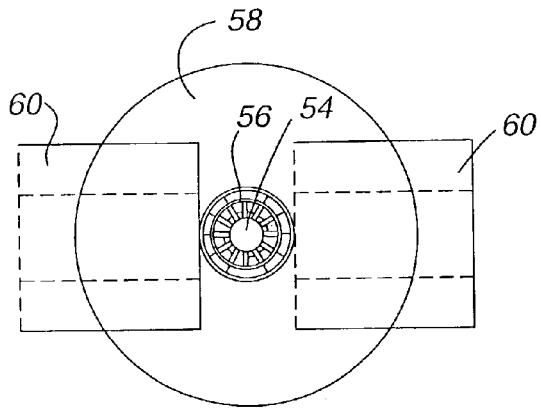
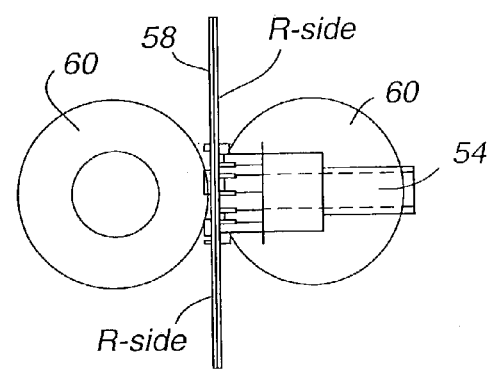
FIG.16A  FIG.16B

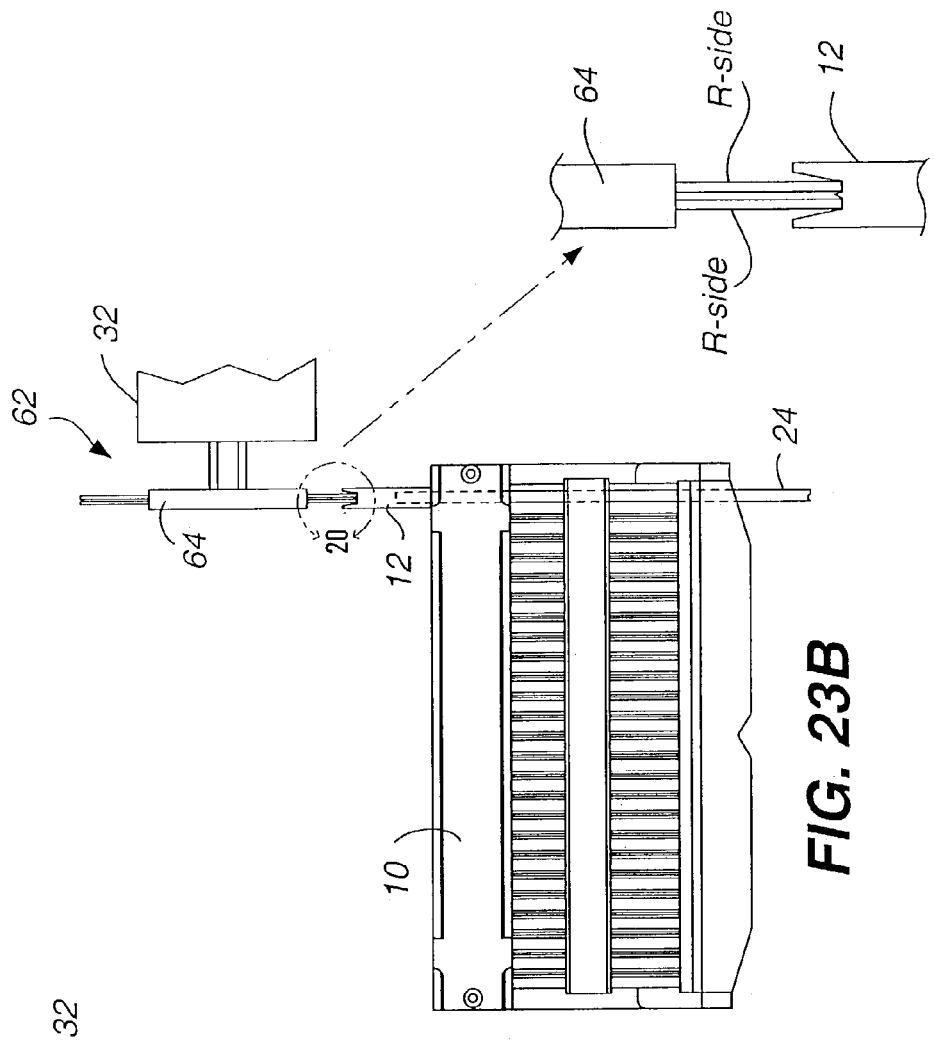
FIG. 24
FIG. 23B
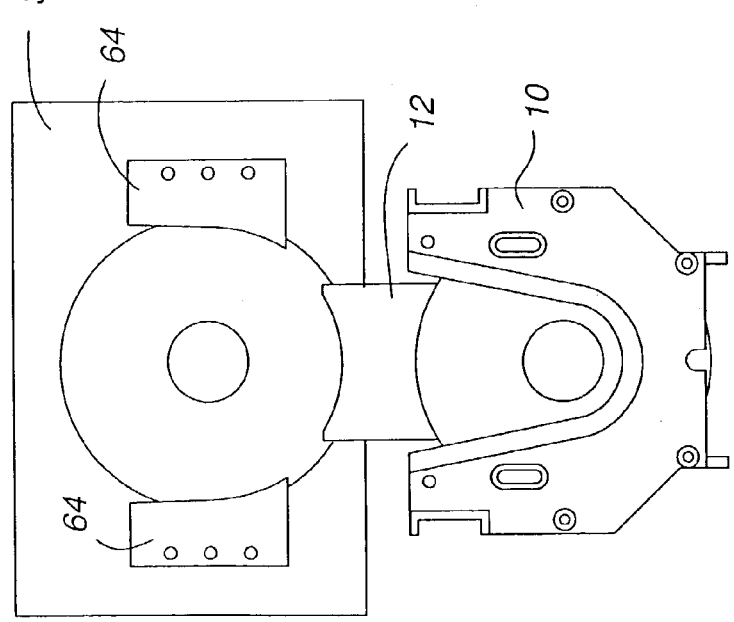
FIG. 23A

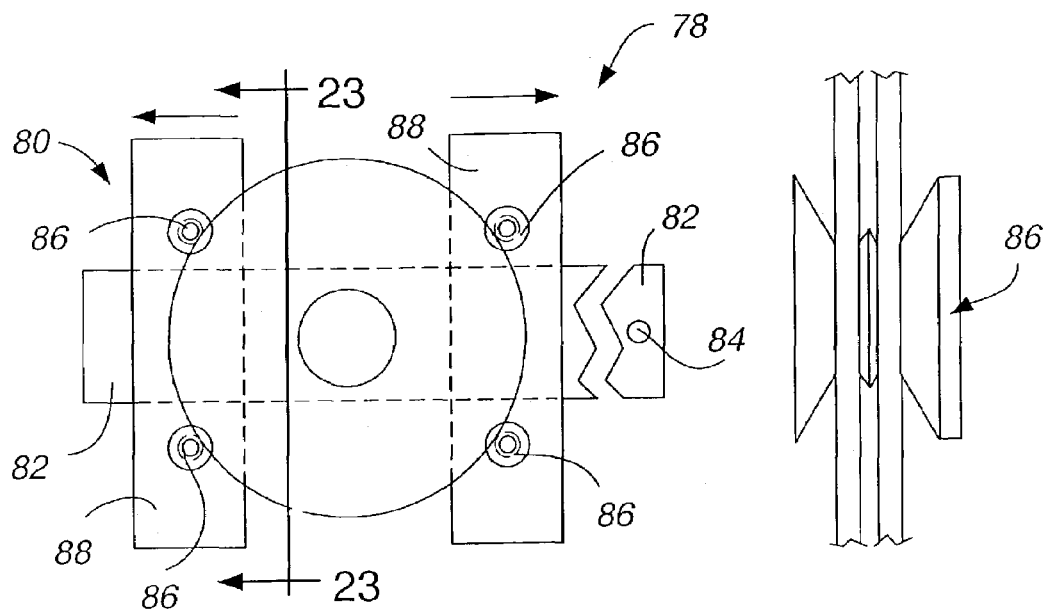
FIG. 25
FIG. 26
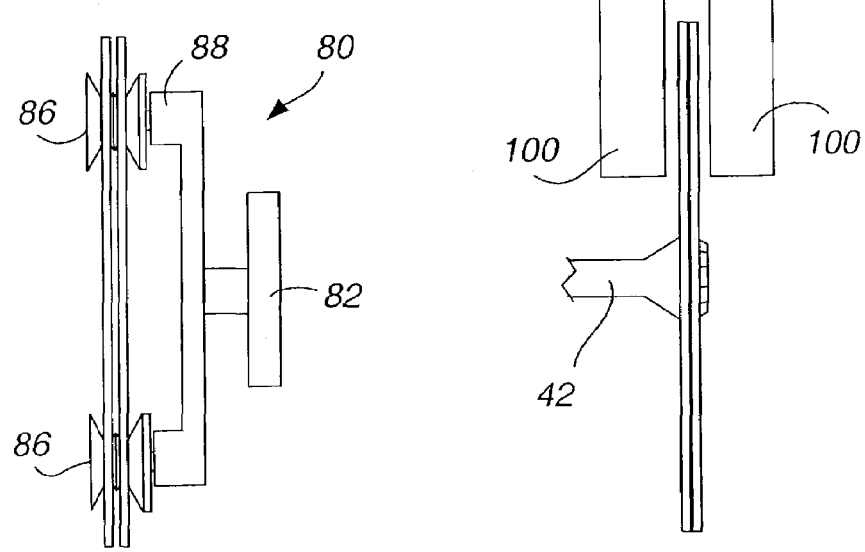
FIG. 27
FIG. 28

METHOD FOR SIMULTANEOUS TWO-DISK TEXTURING

CROSS REFERENCE TO RELATED APPLICATIONS

Priority is claimed from U.S. Provisional Patent Application Ser. Nos. 60/417,623 and 60/417,711, both filed Oct. 10, 2002, which are incorporated by reference herein in their entirety.

The subject matter of the present application is related to the following applications, each of which has a filing date of May 9, 2003: U.S. patent application Ser. No. 10/434,550 entitled "Single-Sided Sputtered Magnetic Recording Disks" in the name of Clasara et al. (Publication No. US-2003-0211361-A1); U.S. patent application Ser. No. 10/435,361 entitled "Dual Disk Transport Mechanism Processing Two Disks Tilted Toward Each Other" in the name of Grow et al. (Publication No. US-2003-0208899-A1); U.S. patent application Ser. No. 10/435,358 entitled "Information-Storage Media With Dissimilar Outer Diameter and/or Inner Diameter Chamfer Designs On Two Sides" in the name of Clasara et al. (Publication No. US-2003-0210498-A1); U.S. patent application Ser. No. 10/435,360 entitled "Method of Merging Two Disks Concentrically Without Gap Between Disks" in the name of Buitron (Publication No. US-2004-0016214-A1); U.S. patent application Ser. No. 10/434,551 entitled "Apparatus for Combining or Separating Disk Pairs Simultaneously" in the name of Buitron et al. (Publication No. US-2004-0035757-A1); U.S. patent application Ser. No. 10/435,572 entitled "Method of Simultaneous Two-Disk Processing of Single-Sided Magnetic Recording Disks" in the name of Buitron et al. (Publication No. US-2003-0211275-A1); U.S. patent application Ser. No. 10/435,161 entitled "W-Patterned Tools for Transporting/Handling Pairs of Disks" in the name of Buitron et al. (Publication No. US-2003-0209421-A1); U.S. patent application Ser. No. 10/435,295 entitled "Method for Servo Pattern Application on Single-Side Processed Disks in a Merged State" in the name of Valeri (Publication No. US-2004-0013011-A1); U.S. patent application Ser. No. 10/535,227 entitled "Cassette for Holding Disks of Multiple Form Factors" in the name of Buitron et al. (Publication No. US-2004-0069662-A1); U.S. patent application Ser. No. 10/434,546 entitled "Automated Merge Nest for Pairs of Magnetic Storage Disks" in the name of Crofton et al. (Publication No. US-2004-00721535-A1); U.S. patent application Ser. No. 10/435,293 entitled "Apparatus for Simultaneous Two-Disk Scrubbing and Washing" in the name of Crofton et al. (Publication No. US-2004-0070859-A1); U.S. patent application Ser. No. 10/435,362 entitled "Cassette Apparatus for Holding 25 Pairs of Disks for Manufacturing Process" in the name of Buitron et al. (Publication No. US-2004-0068862-A1); and U.S. patent application Ser. No. 10/434,540 entitled "Method of Lubricating Multiple Magnetic Storage Disks in Close Proximity" in the name of Buitron et al. (Publication No. US-2003-0209389-A1). Each of these applications is incorporated by reference in its entirety as if stated herein.

FIELD OF THE INVENTION

The present invention is directed to various apparatus and associated methods for simultaneously processing two hard memory disks. More specifically, the present invention relates to simultaneous single-sided texturing of pairs of disks.

BACKGROUND OF THE INVENTION

Hard disk drives are an efficient and cost effective solution for data storage. Depending upon the requirements of the particular application, a disk drive may include anywhere from one to eight hard disks and data may be stored on one or both surfaces of each disk. While hard disk drives are traditionally thought of as a component of a personal computer or as a network server, usage has expanded to include other storage applications such as set top boxes for recording and time shifting of television programs, personal digital assistants, cameras, music players and other consumer electronic devices, each having differing information storage capacity requirements.

Typically, hard memory disks are produced with functional magnetic recording capabilities on both sides or surfaces of the disk. In conventional practice, these hard disks are produced by subjecting both sides of a raw material substrate disk, such as glass, aluminum or some other suitable material, to numerous manufacturing processes. Active materials are deposited on both sides of the substrate disk and both sides of the disk are subject to full processing such that both sides of the disk may be referred to as active or functional from a memory storage stand point. The end result is that both sides of the finished disk have the necessary materials and characteristics required to effect magnetic recording and provide data storage. These are generally referred to as double-sided process disks. Assuming both surfaces pass certification testing and have no defects, both sides of the disk may be referred to as active or functional for memory storage purposes. These disks are referred as double-sided test pass disks. Double-sided test pass disks may be used in a disk drive for double-sided recording.

Conventional double-sided processing of hard memory disks involves a number of discrete steps. Typically, twenty-five substrate disks are placed in a plastic cassette, axially aligned in a single row. Because the disk manufacturing processes are conducted at different locations using different equipment, the cassettes are moved from work station to work station. For most processes, the substrate disks are individually removed from the cassette by automated equipment, both sides or surfaces of each disk are subjected to the particular process, and the processed disk is returned to the cassette. Once each disk has been fully processed and returned to the cassette, the cassette is transferred to the next work station for further processing of the disks.

More particularly, in a conventional double-sided disk manufacturing process, the substrate disks are initially subjected to data zone texturing. Texturing prepares the surfaces of the substrate disks to receive layers of materials which will provide the active or memory storage capabilities on each disk surface. Texturing may typically be accomplished in two ways: fixed abrasive texturing or free abrasive texturing. Fixed abrasive texturing is analogous to sanding, in which a fine grade sand paper or fabric is pressed against both sides of a spinning substrate disk to roughen or texturize both surfaces. Free abrasive texturing involves applying a rough woven fabric against the disk surfaces in the presence of a slurry. The slurry typically contains diamond particles, which perform the texturing, a coolant to reduce heat generated in the texturing process and deionized water as the base solution. Texturing is typically followed by washing to remove particulate generated during texturing. Washing is a multi-stage process and usually includes scrubbing of the disk surfaces. The textured substrate disks are then subjected to a drying process. Drying is performed on an entire cassette of disk drives at a time. Following drying, the textured substrate disks are subjected to laser zone texturing. Laser zone texturing does not involve physically contacting and applying pressure against the substrate disk surfaces like data zone texturing. Rather, a laser beam is focused on and interacts with discrete portions of the disk surface, primarily to create an array of bumps for the head and slider assembly to land on and take off from. Laser zone texturing is performed one disk at a time. The disks are then washed again. Following a drying step, the disks are individually subjected to a process which adds layers of material to both surfaces for purposes of creating data storage capabilities. This can be accomplished by sputtering, deposition or by other techniques known to persons of skill in the art. Following the addition of layers of material to each surface, a lubricant layer typically is applied. The lubrication process can be accomplished by subjecting an entire cassette of disks to a liquid lubricant; it does not need to be done one disk at a time. Following lubrication, the disks are individually subjected to surface burnishing to remove asperities, enhance bonding of the lubricant to the disk surface and otherwise provide a generally uniform finish to the disk surface. Following burnishing, the disks are subjected to various types of testing. Examples of testing include glide testing to find and remove disks with asperities that could affect flying at the head/slider assembly and certification testing which is writing to and reading from the disk surfaces. Certification testing is also used to locate and remove disks with defects that make the surface unuseable for data storage. The finished disks can then be subjected to a servo-writing process and placed in disk drives, or placed in disk drives then subjected to servo-writing. The data zone texturing, laser zone texturing, scrubbing, sputtering, burnishing and testing processes are done one disk at a time, with each surface of a single disk being processed simultaneously.

Although the active materials and manufacturing processes, by their nature, are difficult and expensive to employ, over the years, the technology used to manufacture hard memory disks has rapidly progressed. As a result, the density of information that can be stored on a disk surface is remarkable. Indeed, double-sided test pass disks used in personal computers have much greater storage capacity than most consumers require during the useful life of the computer. Consumers thus are forced to pay substantial amounts for excess storage capacity and the components to access the excess storage capacity. This has caused some disk drive manufacturers, in some current applications, to manufacture and sell disk drives which utilize only one side of a double-sided test pass disk for storage purposes or which use the good side of a double-sided process disk where one surface passed certification testing and the second surface failed. In either case, the second surface, despite being fully processed, is unused. However, the disk drive manufacturer reduces its cost by eliminating the mechanical and electrical components needed to access the unused disk surface. These disk drives are referred to as single-side drives and are typically used in low-end or economy disk drives to appeal to the low cost end of the marketplace. Although this approach may reduce some cost, it does not reduce the wasted cost of manufacturing the unused storage surface of each disk. Thus, substantial savings can be achieved by not only manufacturing disks with a single active or functional side, but doing so in a cost-effective manner.

In contrast to a double-sided disk, a single-sided disk has only one functional memory surface with active recording materials. It is not a double-sided process disk where one side is not accessed or where one side has failed testing. Rather, manufacturing processes are applied in a controlled manner only to one side of the disk using unique single-sided processing techniques. In contrast to conventional double-sided disks, active recording materials are only applied to, and full processing is only conducted on, one side of the disk. Thus, substantial savings are achieved by eliminating processing the second side of each disk.

Additionally, the present invention achieves advantages by utilizing conventional double-sided disk manufacturing equipment and processes, with limited modification. The present invention enables simultaneous processing of two substrate disks through the same equipment and processes used to manufacture double-sided disks. Simultaneously processing two substrate disks results in the production of two single-sided disks in the same time and using essentially the same equipment as currently is used in the production of one double-sided disk. However, each single-sided disk has only a single active or functional surface. For illustrative purposes FIG. 1 shows a side-by-side schematic representation of the processing of one double-sided disk $D_d$, depicted on the left side of FIG. 1, versus the simultaneous processing of two single-sided disks $D_s$, depicted on the right side of FIG. 1. In each case, the double-sided disk or the two single-sided disks are subjected to the same process steps 1 through N, but the single-sided disk processing produces two disks in the same time the double-sided disk processing produces one disk.

A benefit provided by simultaneous single-sided processing of disks is a substantial cost savings achieved by eliminating the application of materials to and processing of one side of each disk. A further, and potentially significant cost savings can be achieved by utilizing existing double-sided disk processing equipment, with limited modification, to process pairs of single-sided disks. A still further benefit is a substantial increase in production (or reduction in processing time depending upon perspective). By utilizing existing double-sided disk processing equipment, approximately twice the productivity of a conventional double-sided production process is achieved (on the basis of numbers of disks produced) in the production of single-sided disks. Moreover, these increased productivity levels are achieved at approximately the same material cost, excepting the substrate disk, as producing half as many double-sided disks.

The simultaneous processing is achieved by combining two substrate disks together into a substrate disk pair or disk pair. A disk pair is two substrate disks that are oriented in a back-to-back relationship with the back-to-back surfaces either in direct physical contact or closely adjacent with a slight separation. The separation can be achieved with or without an intervening spacer. The substrate disk pair progresses through each process step in much the same way as one double-sided disk, but with only the outwardly facing surface of each disk in the pair being subjected to the full process. Thus, the outwardly facing surface of each pair becomes the active or functional surface and the inwardly facing surface of each pair remain inactive or non-functional.

For convenience and understanding, the following terms will have the definitions set forth:

a) "R-side" and "L-side" refer to the active side and inactive side of a disk, respectively. R-side is the side that does or will have active recording materials and memory capability. The R-side may also be referred to as the active or functional side. The L-side is the side that has little or no active recording materials or memory capabilities; it is non-functional or inactive from a data storage stand point.

b) "Merge" means to bring two disks closer together to form a pair of disks, a disk pair or a substrate pair.

c) "Demerge," conversely, means that a merged pair of disks is separated from each other.

d) "Disk" means a finished memory disk and all predecessor configurations during the manufacturing process starting with a substrate disk and progressing to a finished memory disk, depending upon the context of the sentence in which it is used.

e) "Disk pair" or "substrate pair" means two disks positioned in contact merge, gap merge or spacer merge orientation.

f) "Double-sided disk" means a single disk which has been subjected to double-sided processing, whether or not both sides of the disk have passed testing or only one side has passed testing.

g) "Gap merge" means a pair of disks that have been merged, but a space is maintained between the two merged disks. One or more spacers may or may not be used to maintain the gap or space. Gap merge includes both concentric and non-concentric merge. It should be understood that there is no precise dimension or limit to the space between the disks that causes them to be gap merged. Gap merge also includes the situation where the gap between the disks gradually decreases from one perimeter edge to the opposite perimeter edge of the disks when the two disks are angled toward each other. An example is when the bottom perimeter edges of the disks are spaced apart and the upper perimeter edges are in contact.

h) "Single-sided disks" means a single disk which has been subjected to single-side processing, where only one surface of the disk is fully processed.

i) "Spacer merge" means a spacer body is used to create spacing between two gap-merged disks.

j) "Contact merge" means a merged pair of disks where the inside surface of each disk is in contact with the inside surface of the other disk. Contact merge includes concentric and non-concentric merge.

k) "Concentric merge" means that two merged disks have the same axis and, assuming the two disks have the same outside diameter and inside diameter (as defined by the center aperture), their outer and inner perimeter edges are aligned.

l) "Concentric contact merge" means a pair of disks that are oriented in both a contact merge and a concentric merge.

m) "Non-concentric merge" or "off-centered merge" means the two merged disks are not concentric to each other or their perimeter edges are not aligned.

n) "Non-concentric contact merge" means the two contact merged disks are not concentric to each other or their perimeter edges are not aligned.

Referring to FIG. 2, a cross-section of a pair of gap-merged disks is shown. The R-side (active or functional side) is the outwardly facing surface R of each disk within the pair. The L-side (inactive or nonfunctional side) is the inwardly facing surface L of each disk within the pair. In comparison, a cross-section of a pair of concentric contact merged disks is shown in FIG. 3. The relative orientation of the R-side and L-side of each disk remains the same, however, the L-side of each disk of the pair are in contact and the outer and inner perimeter P of each disk is aligned with the outer and inner perimeter P of the other disk.

A conventional double-sided disk is shown in FIG. 4. The left side surface is referred to as the "A" side and the right side surface is referred to as the "B" side. Both the A and B sides are subjected to processing, including the addition of active or magnetic materials. In contrast, with reference to FIGS. 2 and 3, the R-side of each disk in a pair of disks is oriented on the outside of the pair and is subjected to processing in the same fashion as the A and B sides of a double-sided disk. Conversely, the L-side of each disk in a pair of disks is oriented on the inside of the pair and is not subjected to full processing in the same fashion as the A and B sides of a double-sided disk.

SUMMARY OF THE INVENTION

These and other benefits are addressed by the various embodiments and configurations of the present invention. For example, a benefit provided by the present invention is an increased output in the production of finished disks achieved by texturing two single-sided disks simultaneously. Another benefit is that, with limited modifications, the present invention can process pairs of single-sided disks utilizing existing processing equipment originally designed and built to texture double-sided disks. This results in substantial capital equipment savings which would otherwise be spent unnecessarily modifying existing equipment or creating new equipment to process single-sided disks. Moreover, as should be appreciated from a review of the specification and referenced drawings, the present invention has applicability in data zone texturing processes and laser zone texturing processes.

The present invention is generally directed to methods and apparatus for texturing the surface of two single-sided disks simultaneously. In one embodiment, a pair of gap merge disks are removed from a carrier. The pair of disks are repositioned into a concentric contact merge orientation. The outwardly facing surface of each disk in the pair, the R-side, is then subjected to some form of texturing, including data zone texturing or laser zone texturing. The disk pair is then demerged into a gap merge orientation and returned to the carrier. Another pair of disks is then removed from the carrier and the process is repeated.

To prevent relative movement or slippage between the disks during data zone texturing, it may be desirable to submerge the disk carrier in a liquid, such as water, in order that a liquid film is positioned between the disks prior to merging the pair of disks into a concentric contact merge orientation. The liquid film will act as an adhesive and facilitate unified movement of the disks. This promotes consistent and uniform texturing of each disk.

While the pair of disks are preferably in a concentric contact merge orientation during texturing, they may alternatively be positioned in a gap merge orientation. However, because pressure is applied to the outer surface of each disk in the disk pair during the data zone texturing process, a spacer merge orientation may be necessary for this process. Because laser zone texturing does not involve applying any physical force to the surface of the disks, spacers would not be required.

There are generally two data zone texturing techniques: fixed abrasive texturing and free abrasive texturing. In fixed abrasive texturing or free abrasive texturing with slurry, diamond particles, coolant water, strips of paper or fabric embedded with fine grit are brought in contact with and pressed against the outwardly facing surface (R-side) of each disk in the pair. In free abrasive texturing, a rough woven fabric is brought in contact with the R-side of each disk in a pair in the presence of a slurry. The slurry contains diamond particles for texturing the disk surfaces, a coolant to reduce heat created during texturing and a deionized water base solution. In the case of laser texturing, a laser beam is focused on desired locations of the disk surface and no mechanical force is applied against the disks. The disks are rotated in unison and the R-side surface of each disk is thereby textured as desired. Upon completion of the texturing, the disks are demerged.

The demerge methods and apparatus may vary depending upon how the disks are textured. This is primarily due to the fact that the force required to separate or demerge disk pairs is proportional to the force applied against the disks during texturing. In other words, disks which are pressed or forced together are harder to separate than disks that are not forced together. Thus, because the data zone texturing process applies a relatively large force against the disk surfaces, a relatively large force is needed to separate the disks. To reduce the possibility of damaging the disks, the demerge force is preferably spread or dispersed over a larger area of the disk perimeter by configuring the demerge tool to act upon a greater surface area. Conversely, because the forces applied to the disk surfaces during laser zone texturing are substantially smaller, the demerge tools can be smaller and can apply a smaller force over a smaller area of the disk perimeters.

In one embodiment, the demerge tool is wedge-shaped and engages the contact merge disks at their interface. In the case of data zone texturing, a pair of wedge-shaped demerge tools engage the disk pair from opposite directions along a substantial portion of the outer perimeter of each disk pair. In the case of laser zone texturing, the demerge tools may be smaller rollers with a W-shape in cross-section. The W-shape creates a similar wedge which is used to separate the disks. Any number of such rollers may be used, although three or four are preferable for not only demerging but for controlling the pair of disks following the demerge procedure. In a second embodiment, applicable only to data zone texturing, the demerge tool may comprise one or more nozzles which direct a focused stream of water at the interface of the disk pair.

The above-described embodiments and configurations are not intended to be complete nor exhaustive. As will be appreciated, other embodiments of the invention are possible utilizing, alone or in combination, one or more features set forth above or described below.

BRIEF DESCRIPTION OF THE DRAWINGS

FIG. 1 is a schematic of a double-sided disk manufacturing process, on the left, and a schematic of a single-sided disk manufacturing process, on the right.

FIG. 2 is a cross-section of a pair of gap merged disks.

FIG. 3 is a cross-section of a pair of concentric contact merged disks.

FIG. 4 is a cross-section of a conventional double-sided process disk.

FIG. 5B is a cross-sectional view taken along the line 5B—5B of FIG. 5A.

FIG. 6 is an enlarged view of a portion of the apparatus for handling pairs of disks shown in FIG. 5B.

FIG. 10A is a front elevation view of a second apparatus for handling pairs of disks.

FIG. 10B is a side elevation view of the disk handling apparatus shown in FIG. 10A.

FIG. 11 is an enlarged view of a portion of the disk handling apparatus shown in FIG. 10B.

FIG. 12 is a plan view of a roller for engaging pairs of disks.

FIG. 14A is a front elevation view of a pair of disks engaged at their central aperture by a spindle.

FIG. 14B is a side elevation view of the disks and spindle shown in FIG. 14A.

FIG. 15A is a side elevation view of the spindle shown in FIGS. 14A and 14B, but extended to permit engagement with a pair of disks.

FIG. 15B is a front elevation view of the spindle of FIG. 15A.

FIG. 16A is a front elevation view of a pair of texturing rollers positioned to texture the surface of a disk.

FIG. 16B is a side elevation view of a pair of texturing rollers positioned to provide data zone texturing to the surface of two disks.

FIG. 23A is a front elevation view of a disk handling apparatus positioned to lower a pair of disks from a demerge tool to a cassette.

FIG. 23B is a side elevation view of the apparatus of FIG. 23A.

FIG. 24 is an enlarged portion of the disk handling apparatus and demerge tool shown in FIG. 23B.

FIG. 25 is a front elevation view of an alternative embodiment of a demerge tool, showing the demerge rollers engaging a pair of disks.

FIG. 26 is a side elevation view of a demerge roller engaging a pair of disks.

FIG. 27 is a cross-section view taken along line 27—27 of FIG. 25.

FIG. 28 is a side elevation view of a laser zone texturing apparatus.

It should be understood that the drawings are not necessarily to scale. In certain instances, details which are not necessary for an understanding of the invention or which render other details difficult to perceive may have been omitted. It should be understood, of course, that the invention is not necessarily limited to the particular embodiments illustrated herein.

DETAILED DESCRIPTION OF THE PREFERRED EMBODIMENT

Figure 5A:
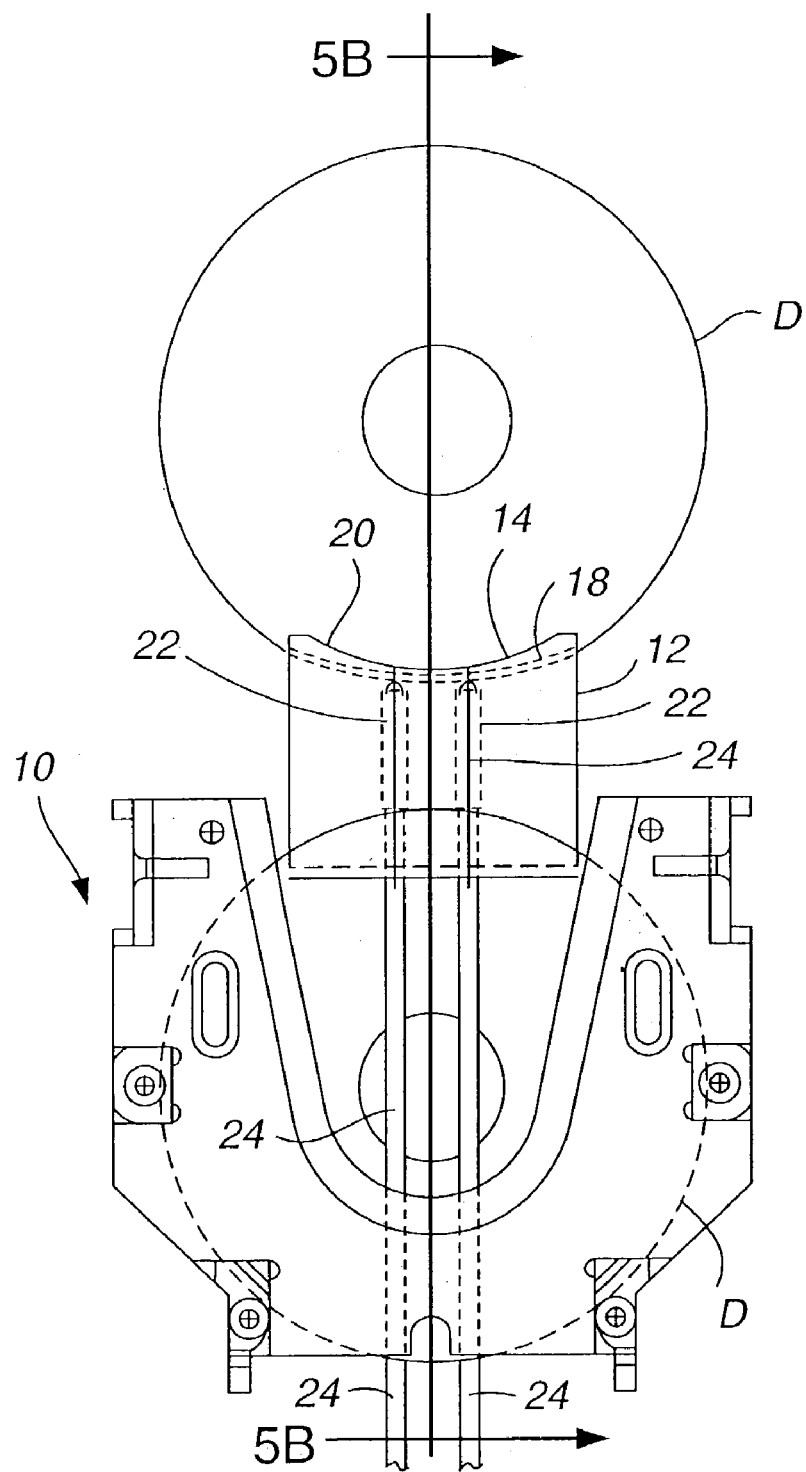
FIG. 5A is a front elevation view of an apparatus for handling disk pairs, with a pair of disks removed from a cassette.
Figure 7:
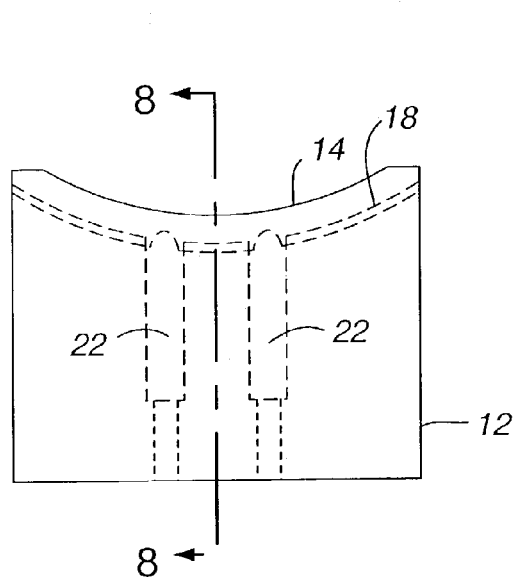
FIG. 7 is a front elevation view of the apparatus for handling pairs of disks shown in FIGS. 5A and 5B.
Figure 8:
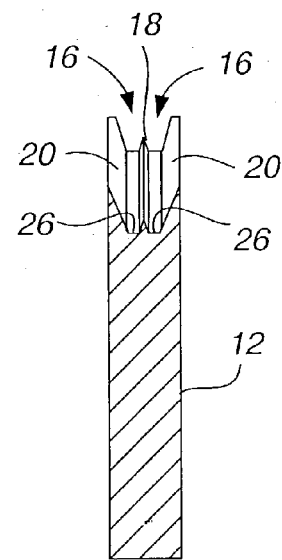
FIG. 8 is a cross-sectional view of the apparatus of FIG. 7 taken along line 8—8 of FIG. 7.

Turning to FIGS. 5A, 5B, a cassette 10 is shown holding multiple pairs of gap merge disks D. The apparatus dimensions discussed herein relate to 95 millimeter diameter disks having a thickness of about 0.050 inches, unless otherwise stated. The spacing between disks of this size in a gap merge pair is preferably about 0.035 inches, although the space can extend from about 0.025 inches and larger. It should be understood that the apparatus and method of the present invention will work with disks of different diameters and thicknesses, in which case dimensions may vary from those stated herein. The gap merge orientation of the pairs of disks is best illustrated in FIG. 5B.

As shown in FIGS. 5A and 5B, one embodiment of a lift saddle 12 is utilized to remove and return pairs of disks from and to the cassette. The lift saddle 12 has an arcuate shaped disk engaging portion 14 comprising two channels or grooves 16 separated by a raised center ridge or tooth 18 (FIGS. 6–9). The outer walls 20 of the disk engaging portion 14 support the outside edge of the disks. The saddle 12 includes two recesses or bores 22 positioned central to its body for receiving and securing push rods 24. The push rods 24 move the lift saddle 12 between a first position beneath the cassette 10 and a second position extended through and above the cassette, as seen in FIGS. 5A, 5B. As a result, the lift saddle 12 can remove and return pairs of disks from and to the same or a different cassette.

In the texturing processes it is preferable, although not required, to position the cassette 10 of disks in a tank of deionized water or similar liquid such that the disks are fully submerged. As discussed in greater detail below, in the preferred embodiment, the disk pair will be repositioned into a contact merge orientation. A liquid film between the disks helps prevent relative slippage of the disks during the texturing process. Placing the disks in a submerged environment allows a sufficient film to form on the disks and act as an adhesive when in a contact merge orientation. The cassette 10 is also positioned in an indexing apparatus, not shown, that incrementally moves the cassette as pairs of disks are returned from processing so that not-yet-processed disks are positioned for removal for processing by the lift saddle.

The push rods 24 will move the lift saddle 12 to a position where it will engage a first pair of gap merge disks and remove the pair to a position above the cassette (FIGS. 5A, 5B). In the raised position, shown in FIG. 5B, the pair of disks will be engaged by additional processing equipment, discussed below. In the embodiment shown, primarily used in connection with data zone texturing, and in connection with a 95 millimeter diameter disks having a thickness of 0.050 inches, the flat portion 26 of each channel of the lift saddle has a width ($W_1$ in FIG. 9) of approximately 0.046 inches. The center to center distance between the channels is 0.075 inches ($W_2$ in FIG. 9). Therefore, the width of the center ridge 16 is 0.025 inches; this is also the gap distance between the L-side of each disk in a pair. The angle of the side walls 20 for each channel 16 is approximately 40 degrees, and the angle formed by the walls of the center ridge or tooth 18 is approximately 40 degrees. In the preferred embodiment, the disks include a chamferred outer perimeter edge that matches or closely matches the angle of the tooth and outer walls which permits the flat portion 26 to have a width less than the thickness of the disk. The dimensions of the disk engaging portion of the lift saddle can be altered to accommodate disks of different size, diameter and thickness.

In order to process two R-sides (active sides) simultaneously, the non-functional or non-active sides (L-sides) of the disk pair are preferably merged. For texturing, the disk pair is preferably positioned in a concentric contact merge orientation. It is preferable when texturing two disks simultaneously that there be no relative movement or slippage between the two contact merge disks. To enhance the ability of two disks to move in unison, i.e. not to slip relative to each other, a fluid layer is uniformly deposited between the inactive side (L-side) of each disk. The fluid layer acts as a binding agent to keep the disks together. This may be accomplished by submerging the disks in a pool of deionized water. When the lift saddle removes two disks from the cassette, the water will drain away, leaving the desired water or film layer on the surface of the disks. The layer is preferably between 0.1 and 10 microns thick. Because the disks are polished substrate disks at this point in the manufacturing process, the relative flatness of the surface will increase stiction between the two disks.

With reference to FIGS. 10–13, once a pair of gap merge disks are positioned above the cassette 10 by the lift saddle 12, the pair is engaged by a plurality of rollers or grip fingers 28. The rollers 28 are rotatably mounted on merge arms 30. The merge arms 30, in turn, are mounted for lateral movement on a rotatable housing 32. As illustrated in FIGS. 11 and 12, the rollers 28 are shaped to remove the gap between the disks and create a concentric contact merge orientation, i.e., to merge the disks. More specifically, the channel 34 formed in the rollers has a flat base portion 36 having a width $W_3$ similar to that of the flat portion 26 of the channel 16 of the lift saddle 12 (approximately double thickness of a single disk). The beveled inside walls 38 are oriented at a preferred angle of approximately 94 degrees to accommodate the 45-degree chamfer in the outer perimeter edge of the disks and function to engage the pair of disks along their outer perimeter while the disks are simultaneously supported by the lift saddle 12 in a gap merge orientation. It should be appreciated that the angle of the rollers can change to complement the angle of the chamfer in the disk perimeter. As the merge arms 30 move laterally inwardly, the lift saddle 12 retracts. This lateral inward movement of the merge arms 30 moves the rollers 28 laterally inwardly and into engagement with the disks. As a result, the space between the pair of disks is removed. A flexible or plastic cup 40 is mounted on the housing 32 and applies an outward force F, seen in FIG. 10B, which also facilitates removal of the gap between the disks and assists in squeezing some of the deionized water out from between the disks. The force applied by the cup is typically no more than ten pounds and further increases the stiction between the disks. The plastic cup may be used in either data zone texturing or laser zone texturing. The disks are also drawn together or merged by the capillary action created as the deionized water drains out from between the disk pair as the lift saddle 12 removes the disk pair from their submerged position in the cassette 10. Although four rollers are shown, three rollers are sufficient to securely hold and merge the pair of disks and allow the lift saddle to retract.

Once the rollers 28 have securely grasped the disk pair and the saddle 12 has retracted, the housing rotates 90 degrees. (Clockwise in FIG. 13.) The disks are now positioned to be engaged by a spindle assembly 42. The spindle assembly 42, illustrated in FIGS. 14A, 14B, 15A, 15B, 16A and 16B, is primarily used in connection with data zone texturing, although any suitable spindle assembly would work, and this spindle assembly could also be used for laser zone texturing. The spindle assembly 42 includes an expandable collette 44 positioned at the end of a spindle shaft 46. The collette 44 includes a series of teeth or a jaw set 48 alternately offset to engage the internal edge 50 formed by the central aperture 52 of each disk. Thus, every other tooth engages one disk and the remaining teeth engage the other disk. The spindle assembly 42 further includes a longitudinally extendable cam shaft 54 with a camming member 56 disposed on the distal end of the shaft 54. In operation, with the cam shaft 54 extended as shown in FIG. 15A, the diameter of the collette 44 is less than the diameter of the central aperture 52 of the disks. When the cam shaft 54 is retracted, the cam member 56 interacts with inside of the collette 44 to expand the collette 44, causing the teeth 48 to engage the internal edge 50 of the central aperture 52 of both disks. Alternatively, as shown in FIGS. 14A, 14B and 15B, some of the teeth 48 may extend through the central aperture 52 of both disks and engage the outer surface 58 of the outer disk to further facilitate securement of the disk pair and prevent disk to disk slippage. Once the spindle shaft 46 is secured to the disks, the grip fingers or rollers 28 release and the disk pair is fully supported by the spindle shaft 46 in concentric contact merge orientation. In the preferred embodiment, a flexible cup 40 is also utilized as a counterbalance to the spindle assembly 42. The cup 40 is positioned on the housing 32 opposite the spindle assembly 42. The cup 40 is hollow to allow the spindle assembly 42 to expand through the central aperture 52 of the disks. The cup 40 provides a surface which pushes against the disks to counterbalance engagement of the disks by the spindle. The cooperation of all elements creates a concentric contact merge pair of disks securely affixed to the spindle assembly 42.

Once the pair of disks is secured on the spindle assembly 42, the rollers 28 disengage and move away from the disks. The housing 32 then rotates back to its original position. Four texturing rollers 60 are then positioned as shown in FIGS. 16A and 16B; two on each side of the spindle and two in contact with each disk. If fixed abrasive texturing is utilized, an abrasive tape or fabric, not shown, is wrapped around the rollers 60. The abrasive tape contains fine grit or diamond particulate. If free abrasive texturing is utilized, a rough woven fabric is wrapped around each roller and a slurry is applied to the fabric and rotating disks to texture the disks. The slurry contains diamond particulates to texturize the disk surfaces, coolant to maintain lower temperatures and a deionized water base solution. In either texturing process, each of the rollers 60 is pressed against a portion of a disk surface with approximately 2.75 pounds of force while the spindle assembly spins the pair of disks at approximately 1,000 revolutions per minute. This action textures the data zone of the R-side of each disk. Optimum texturing is achieved if the two disks do not slip relative to each other. The inward pressure on the disk pair created by the opposed action of the texturing rollers further increases stiction between the disks.

Figure 18A:
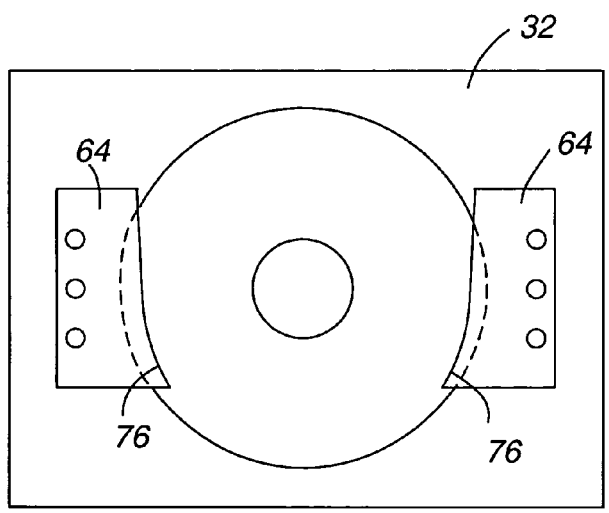
FIG. 18A is a front elevation view of the demerge tool shown in FIG. 17A, showing the demerge tool engaging a pair of disks.
Figure 18B:
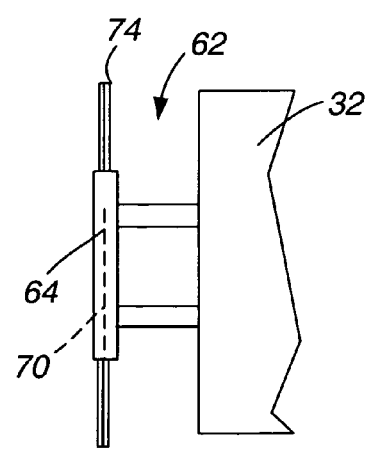
FIG. 18B is a right elevation plan view of the apparatus shown in FIG. 18A.
Figure 19:
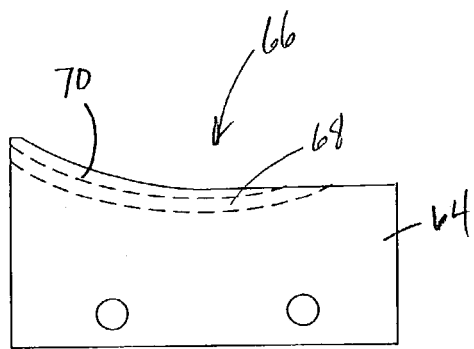
FIG. 19 is a front elevation view of the demerge saddle shown in FIG. 17A.
Figure 20:
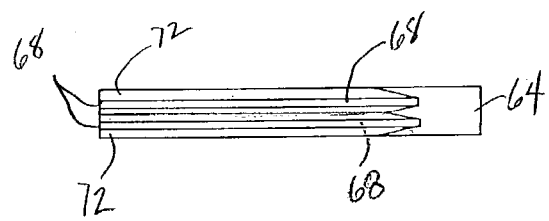
FIG. 20 is a top elevation view of the demerge saddle shown in FIG. 19.
Figure 21:
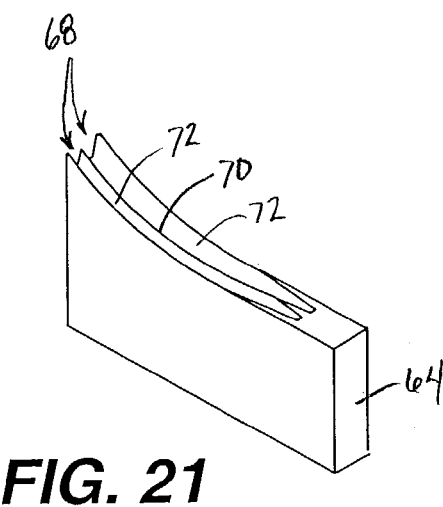
FIG. 21 is a perspective view of the demerge tool shown in FIG. 19.
Figure 22:
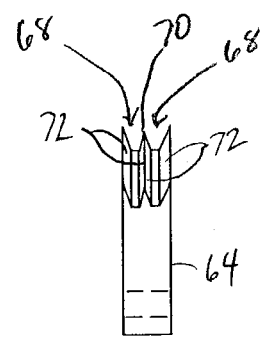
FIG. 22 is a cross-section view taken along line 22—22 of FIG. 20.

A demerge tool 62 is used to unload the pair of textured disks from the spindle assembly 42. The demerge tool 62 is illustrated in FIGS. 13 and 17–22. The demerge tool includes a pair of demerge saddles 64 that are mounted on the housing 32 such that they can move laterally relative to the housing to engage opposite outer perimeter edges of the disks. As best seen in FIGS. 19 and 22, the demerge saddles 64 include a curved portion 66. The curved portion 66 includes a pair of parallel channels or grooves 68 with a ridge or wedge 70 separating the two channels. Similar to the lift saddle 12, the channels 68 are curved to follow the radius of the disk pair. The channels 68 may have a V-shape in cross-section, or, as shown in FIG. 22, the demerge saddle channels 68 may have a flat bottom portion. The walls 72 of the channels 68 are angled to match the angle of the chamfer of the outer perimeter edge of the disks. Thus, if the disks have a 45-degree chamfer, the side walls 72 will be formed at about 90 degrees.

In addition to engaging the disk pair, a function of the demerge saddle 64 is to demerge the disk pair and reposition the disk pair from a concentric contact merge orientation to a gap merge orientation. Accordingly, the wedge 70 abuts the groove 74 formed by the chamfers of the abutting L-side disk surfaces (FIG. 18B). To successfully demerge the pair of disks, the demerge tool 62 must overcome the stiction between the pair of disks. In this circumstance, the stiction is increased due to the pressure applied against the disk surfaces, such as by the tape rollers 60 against the disks, due to the water layer between the disks and due to the relative flatness of the L-side disk surfaces. In this embodiment, the demerge saddles 64 are designed to apply up to approximately 10 pounds of force to demerge the disk pair, although it is preferred to use less force to minimize potential damage to the disks. The amount of force needed can be reduced by applying the demerge tool against a larger perimeter edge of the disks. The demerge tool 62 is also designed to support the disk pair in order to allow the spindle assembly 42 to disengage before the demerge force is applied. The lower, inwardly extending portion 76 of each demerge saddle 64 supports the disk pair after the spindle assembly 42 has disengaged (FIG. 18A).

With the disk pair securely engaged by the demerge tool 62, the housing 32 rotates to position the demerge tool 62 above the cassette as shown in FIGS. 23A and 23B. The lift saddle 12 raises and engages the lower perimeter edge of the disk pair. The gap merge spacing of the channels 16 of the lift saddle 12 correspond to the gap merge spacing of the channels 68 of the demerge saddles 64 as shown in FIG. 22. When the disk pair is re-engaged by the lift saddle 12 (FIGS. 23A, 23B, 24), the demerge saddles 68 disengage. The lift saddle 12 lowers the disk pair and seats them in the cassette 10. The cassette 10 then indexes to a new position and the lift saddle 12 engages and removes a new pair of disks from the cassette 10. The preferred sequence has one pair of disks engaged on the spindle assembly 42 and being textured while a second pair that has just completed texturing is returned to the cassette and a new, untextured pair is loaded between the rollers 28.

As previously stated, the present invention can also be utilized for laser zone texturing the R-side surfaces of the disks. In contrast, with laser zone texturing, the disk surfaces are not mechanically contacted. As a result, there is even less stiction between the disks. Therefore, the demerge tool 62 may be configured differently for a laser zone texture process than for a data zone texture process.

FIGS. 25–32 illustrate a second embodiment of a disk handling assembly 78. This disk handling assembly is primarily designed for laser zone texturing operations, although it could also be used for handling disks at other points in the manufacturing process. In laser zone texturing, a pair of gap merge disks are engaged by a lift saddle 12 and removed from a cassette. The lift saddle, shown in FIG. 9B, has subtle differences with respect to the disk engaging portion 14 compared to the lift saddle illustrated in FIG. 9A and is primarily intended for use in data zone texturing processes. In particular, outer walls 20 include an upper surface 20a and a lower surface 20b. The upper surfaces of the opposed side walls form a 40-degree angle, the lower surfaces of the opposed side walls form a 20-degree angle. The interface between the upper surface 20a and lower surface 20b occurs at 0.040 inches above the flat portion 26 which forms the base of the channels 16 ($H_1$ in FIG. 9B). The width of each channel $W_1$ is 0.046 inches for disks having a thickness of 0.050 inches. The height $H_2$ of the center ridge 18 is 0.097 inches. The width of the center ridge $W_3$ is 0.045 inches.

Figure 9A:
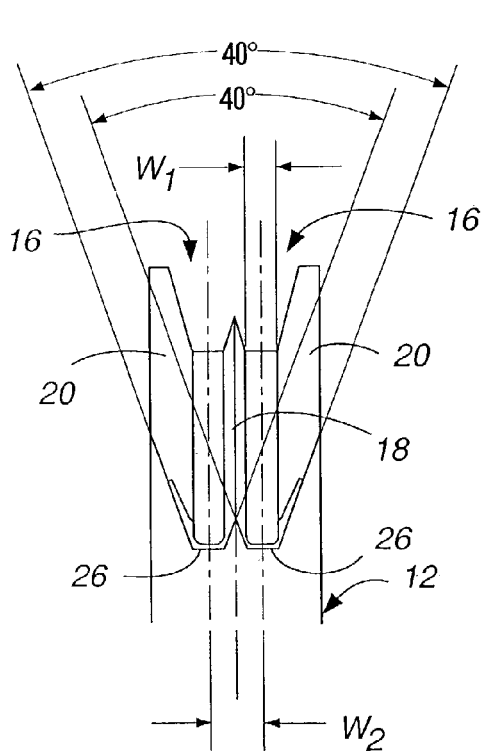
FIG. 9A is an enlarged view of the upper portion of the disk handling apparatus of FIG. 8.
Figure 9B:
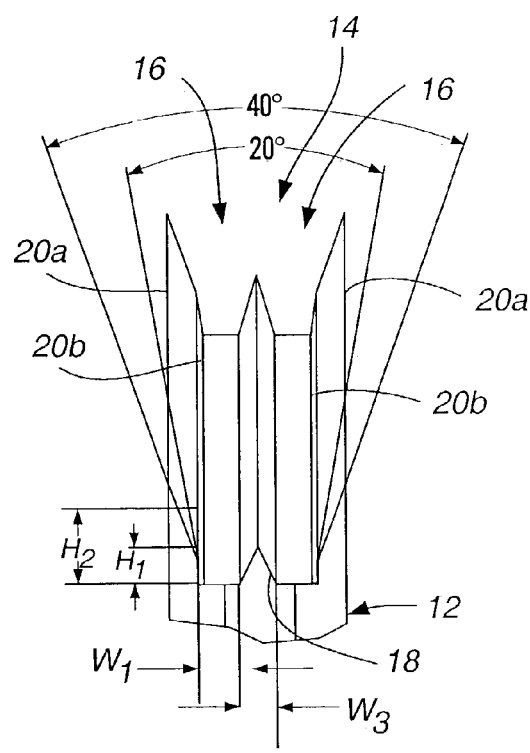
FIG. 9B is an enlarged view of the upper portion of an alternative embodiment of the disk handling apparatus shown in FIG. 9A.
Figure 13:
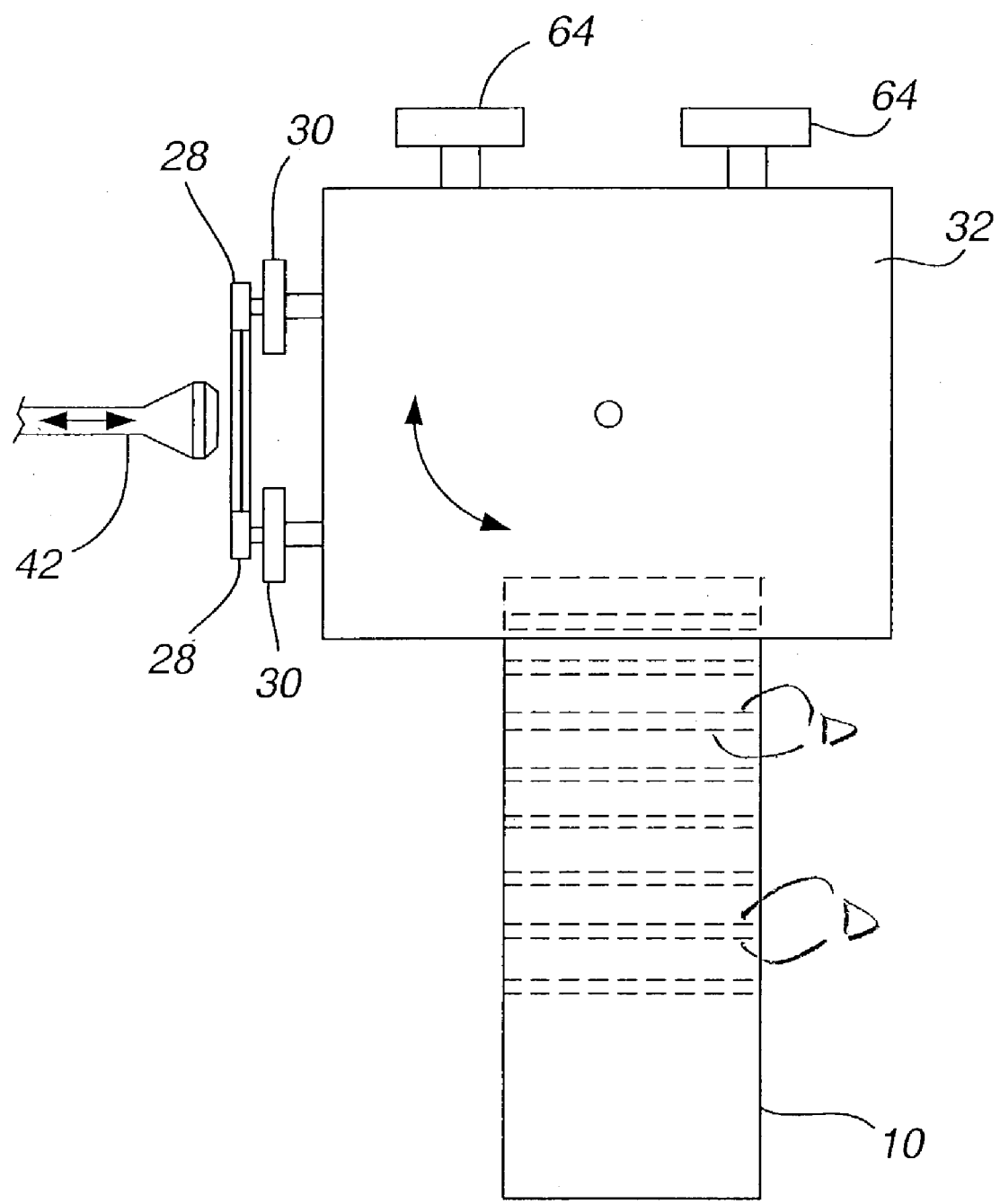
FIG. 13 is a top elevation view of the disk handling apparatus shown in FIG. 10A, further showing a disk carrying cassette and a spindle for engaging disk pairs.
Figure 17A:
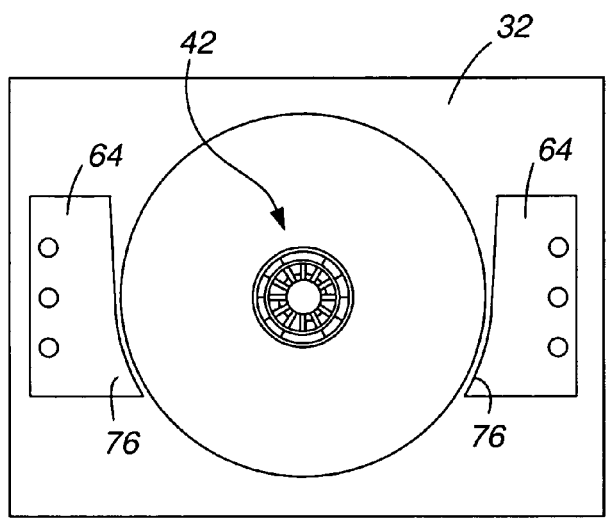
FIG. 17A is a front elevation view of a demerge tool for demerging a pair of contact merge disks.
Figure 17B:
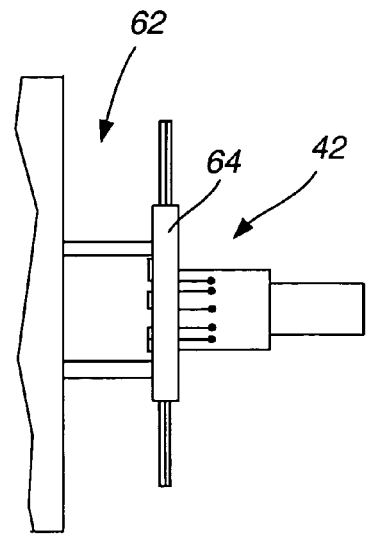
FIG. 17B is a left side elevation view of the apparatus of 17A.

The disk handling apparatus 78 of FIGS. 25–32 can be used to engage and remove disks from a lift saddle 12, such as shown in FIG. 9B, and to return disks to a lift saddle 12 and is primarily intended for use in laser zone texturing. The disk handling assembly 78 includes two separate but identical disk handling mechanisms 80 positioned at opposite ends of a rotatable plate 82. Thus, the disk handling assembly 78 can simultaneously handle two different pairs of disks. The rotatable plate 82 has a pivot point 84 at its center which allows the plate to move through a 180-degree motion moving each disk pair between a first and second position. The first position is located above a cassette such that a lift saddle can lift a pair of disks to the first position and the disk pair can be engaged by a first disk handling mechanism 80 disposed at one end of plate 82. Simultaneously, the second disk handling mechanism 80, disposed at the opposite end of the plate 82, has transported a second disk pair to a second position for processing. When the processing is completed, the plate 82 rotates and the second disk handling mechanism returns the processed disks to the first position where the disk pair is loaded on the lift saddle 12 and returned to a cassette and the first disk handling mechanism 80 moves the unprocessed disks to the second position for processing.

Figure 30:
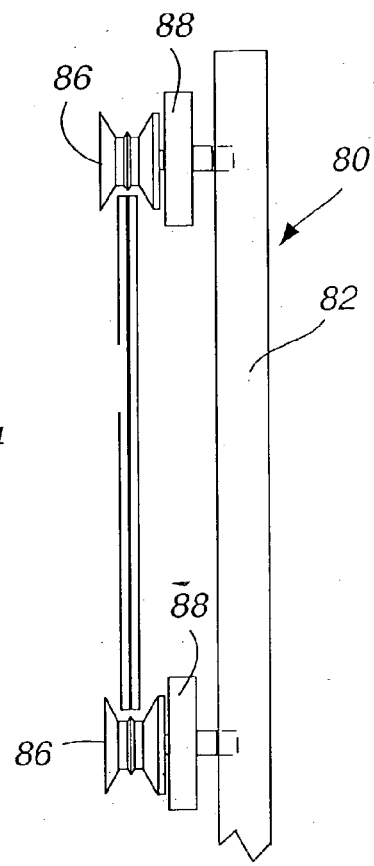
FIG. 30 is a top elevation view of the demerge device tool of FIG. 29.
Figure 31:
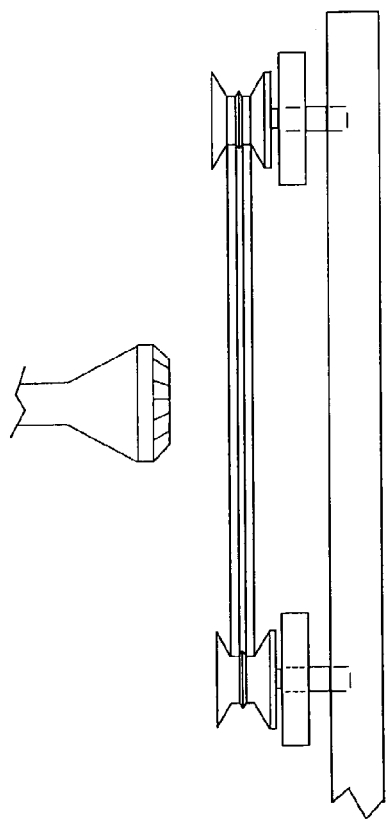
FIG. 31 is a top elevation view of the demerge tool shown in FIG. 25, further showing a retracted spindle.
Figure 32:
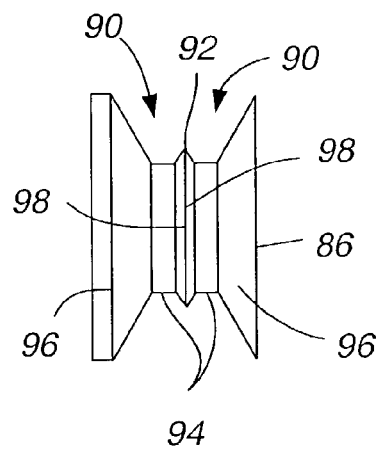
FIG. 32 is a front elevation view of a demerge roller.

The mechanism includes four gap rollers 86 rotatably mounted on arms 88 (FIGS. 25, 27, 29–31). The arms 88 move laterally on a rotatable plate 82, allowing the rollers 86 to engage and disengage the disk pair. A gap roller 86 is shown in FIG. 32. As shown, the roller 86 has a pair of channels 90 separated by a control wedge 92. Each channel has a flat bottom portion 94, although each channel could also be V-shaped in cross-section instead. As with the other rollers described herein, the angle formed by the inner side walls 96 and the walls 98 of the wedge 92 correspond to the angles of the outer perimeter edge chamfer of the disks. As shown in FIG. 26, the rollers 86 are designed to maintain gap merge orientation of the disks.

Figure 29:
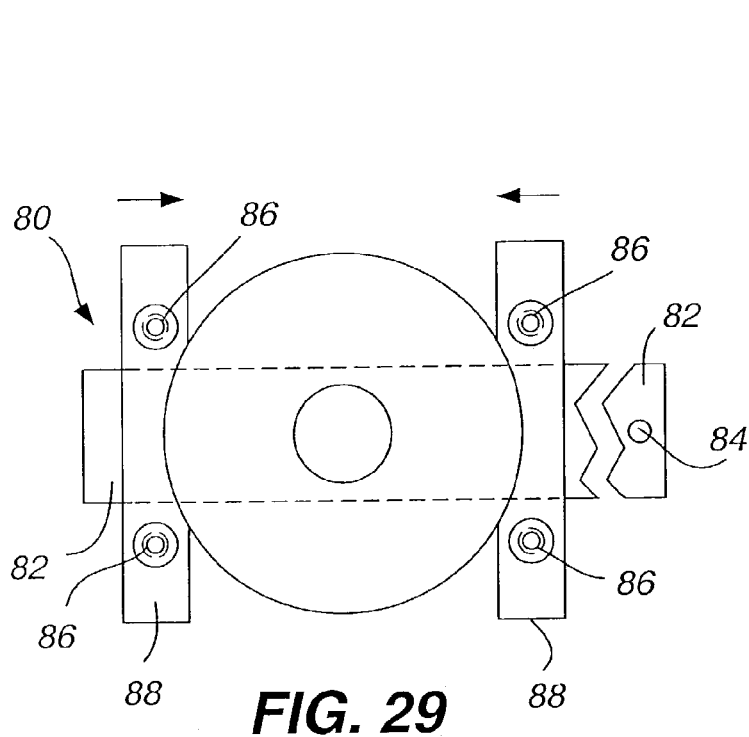
FIG. 29 is a front elevation view of the demerge tool shown in FIG. 25, showing the demerge rollers disengaged from the disk pair.

FIGS. 25 and 27 show a disk handling mechanism 80 engaging a pair of disks, such as following disengagement of the pair by a lift saddle 12. In this context, the plate 82 will rotate the disk handling mechanism to the second or processing location for presentation of the disk pair to a spindle assembly 42. As shown in FIG. 31, the disk assembly will engage the pair and position the disk pair for engagement by a spindle assembly 42 for subsequent processing. The disk handling mechanism 80 will disengage the disk pair, as shown in FIGS. 29, 30. As shown in FIG. 28, such processing may include laser zone texturing performed by a pair of laser beams 100. The lasers perform laser zone texturing on the R-side surface of each disk. Following processing, the disk handling mechanism 80 will re-engage the disk pair (FIGS. 25–27) and the spindle assembly 42 will disengage. As shown in FIGS. 30 and 31, the grip rollers 86 will position themselves at the outer perimeter of the pair of contact merged disks. The arms 88 will press inwardly on the disk pair, forcing the wedge 92 between the pair of disks. Because the stiction is less than that formed between the disks during data zone texturing, the gap rollers 86 are mechanically sufficient to demerge the disks, allowing the spindle assembly to fully disengage. In this embodiment, approximately four pounds of force applied by the gap rollers will demerge the disks. In contrast, because the stiction between the contact merged disk pair is greater in the data zone texturing context, the demerge tools 62 engage the disks over a much greater perimeter length than do the gap rollers 86. The larger contact area provides greater mechanical leverage to more readily separate the contact merge pair.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations and modifications are within the scope of the invention, e.g. as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method of manufacturing hard disks for use in a disk drive, the method comprising:
    a. placing a plurality of disks in a carrier;
    b. removing a pair of disks from the carrier;
    c. combining the pair of disks in a merge orientation prior to texturing;
    d. simultaneously texturing one surface of each of said disks while in a merge orientation;
    e. returning the pair of disks to the carrier.

2. The method of claim 1, wherein the disks are in one of a gap merge orientation or spacer merge orientation during texturing.

3. The method of claim 2, wherein the disks are in a gap merge orientation during texturing.

4. The method of claim 2, wherein the disks are in a spacer merge orientation during texturing.

5. The method of claim 2, wherein combining the disks in an abutting relationship comprises securing the pair of disks together.

6. The method of claim 1, wherein the disks are in a contact merge orientation during texturing.

7. The method of claim 6, further comprising forming a liquid layer between the pair of disks prior to combining the disks in a contact merge orientation.

8. The method of claim 6, further comprising demerging the pair of disks prior to returning the pair of disks to the carrier.

9. The method of claim 8, wherein the contact merge orientation defines an interface between the pair of disks and demerging comprises contacting the pair of disks at the interface.

10. The method of claim 9, wherein contacting the disks at their interface comprises directing a wedge between the disks.

11. The method of claim 10, further comprising directing multiple wedges between the disks.

12. The method of claim 6, wherein the disks are in a concentric contact merge orientation during texturing.

13. The method of claim 1, further comprising submerging the carrier in a liquid bath before removing a pair of disks from the carrier.

14. The method of claim 1, wherein the plurality of disks are placed in the carrier in a gap merge orientation.

15. The method of claim 14, wherein the gap between disks of a pair is approximately 0.035 inches or less.

16. The method of claim 14, wherein the gap between disks of a pair is 0.025 inches or greater.

17. The method of claim 1, wherein said texturing is data zone texturing.

18. The method of claim 17, further comprising rotating the disks during texturing.

19. The method of claim 1, wherein said texturing is laser zone texturing.

20. The method of claim 19, further comprising rotating the disks during texturing.

21. The method of claim 1, further comprising substantially maintaining the position of one disk relative to the other disk during texturing.

22. A method of manufacturing hard disks, comprising:
  a. placing a plurality of disks in a carrier, with a space between adjacent disks;
  b. forming a liquid layer between the disks;
  c. removing a pair of adjacent disks from the carrier;
  d. merging the removed pair of disks to remove the space between the disks such that one surface of each disk is in contact with one surface of the other disk, and the opposite surface of each disk faces outwardly;
  e. texturing the outwardly facing surface of each disk in the pair simultaneously.

23. The method of claim 22, further comprising separating the disks following texturing.

24. The method of claim 23, wherein separating the disks comprises directing a wedge between the disks.

25. The method of claim 22, wherein forming a liquid layer between the disks comprises submerging the disks in a liquid bath.

26. The method of claim 22, wherein the step of placing a plurality of disks in a carrier further comprises arranging the disks in pairs, such that the spacing between disks of a pair is less than the spacing between adjacent pairs of disks.

27. The method of claim 26, wherein the pairs of disks are in a gap merge orientation.

28. The method of claim 22, wherein merging the disks to remove the space between the disks comprises placing the disks in a concentric contact merge orientation.

29. The method of claim 22, wherein texturing the disks comprises data zone texturing.

30. The method of claim 22, wherein the texturing comprises laser zone texturing.

31. The method of claim 22, further comprising contacting the disks with a demerge tool following texturing.

32. A method of manufacturing disks used in hard disk drives, the method comprising:
  a. placing a plurality of disks each having a central aperture in a carrier with a gap between adjacent disks;
  b. removing a pair of disks from the carrier;
  c. merging the pair of disks;
  d. simultaneously texturing the outwardly facing surface of each disk;
  e. demerging the pair of disks.

33. The method of claim 32, further comprising returning the pair of demerged disks to the carrier.

34. The method of claim 32, further comprising using a merging tool to merge the pair of disks.

35. The method of claim 32, further comprising using a demerge tool to separate the pair of disks.

36. The method of claim 32, wherein placing a plurality of disks in a carrier comprises positioning the disks in pairs, with each pair of disks in a gap merge orientation.

37. The method of claim 32, further comprising positioning a spindle in the central aperture of the pair of disks prior to texturing.

38. The method of claim 37, further comprising rotating the spindle and pair of disks during texturing.

39. The method of claim 37, wherein the step of positioning a spindle in the center aperture of the pair of disks comprises expanding a portion of the spindle to engage the disks.

40. The method of claim 32, wherein said texturing comprises data zone texturing.

41. The method of claim 32, further comprising placing a liquid layer between the disks prior to texturing.

42. Then method of claim 41, further comprising removing liquid from between the disks prior to texturing.

43. The method of claim 32, wherein merging the disks comprises placing the pair of disks in a contact merge orientation.

44. The method of claim 43, further comprising placing the pair of disks in a concentric contact merge orientation.

45. The method of claim 32, wherein the step of texturing is laser zone texturing.

46. The method of claim 32, wherein the step of merging the disks comprises using a plurality of rollers engaging the outside perimeter of the disks.

47. The method of claim 32, wherein texturing the disks comprises contacting the disks with an abrasive.

48. A method of manufacturing hard disks for use in a disk drive, the disks being circular and having an opening in their center, the method comprising:
  a. placing a plurality of disks in a carrier;
  b. removing a pair of disks from the carrier;
  c. combining the pair of disks in an abutting relationship;
  d. securing the pair of disks at their center;

e. simultaneously texturizing one surface of each disk of the pair of disks; and f. returning the pair of disks to a carrier.

49. The method of claim 48, wherein placing a plurality of disks in a carrier comprises placing the plurality of disks in a first carrier, and returning the pair of disks to a carrier comprises returning the pair of disks to the first carrier.

* * * * *